May 26, 1953  A. J. McMASTER ET AL  2,639,904
MIXER
Filed Dec. 13, 1949  3 Sheets-Sheet 1
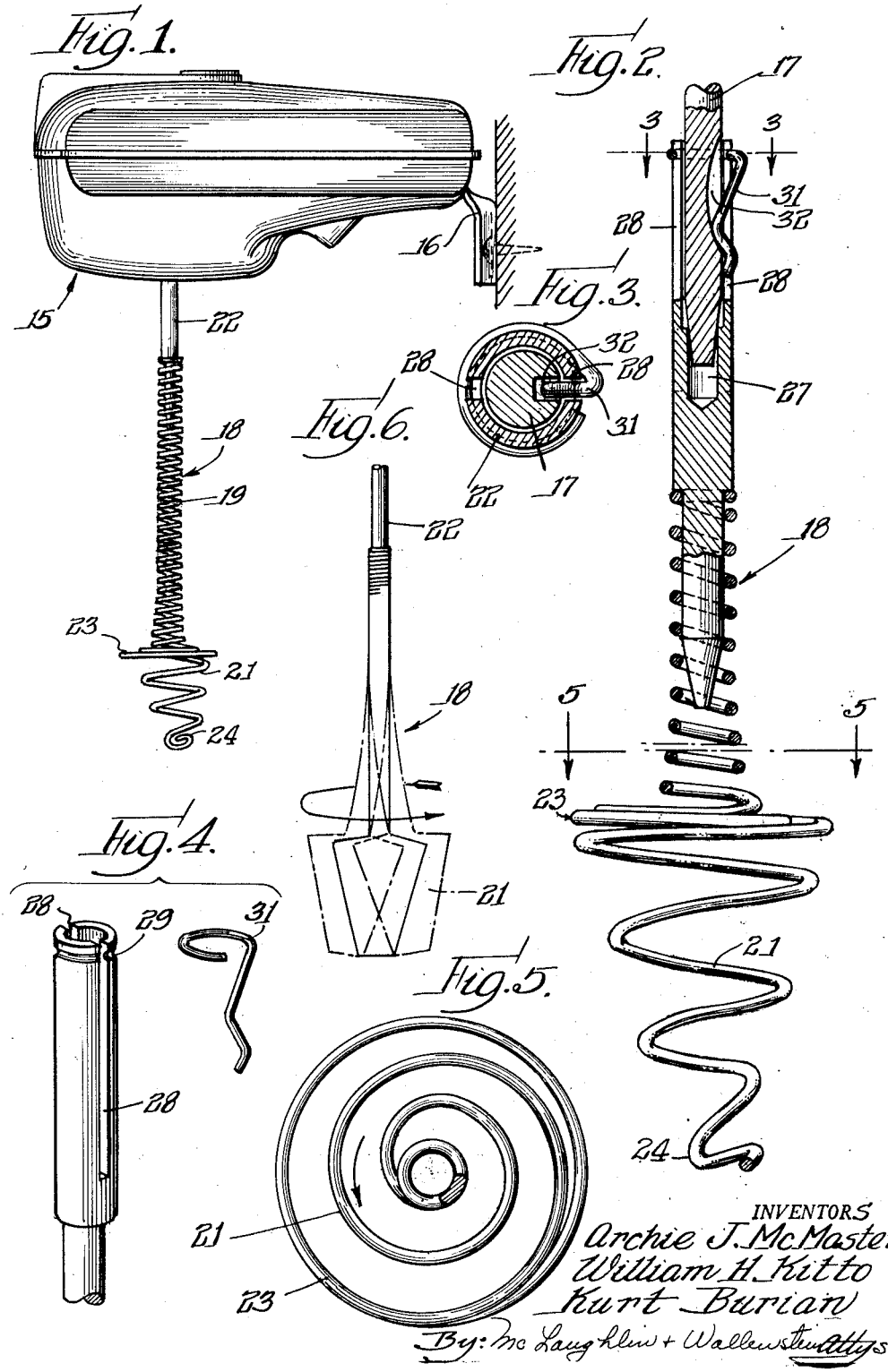
INVENTORS
Archie J. McMaster
William H. Kitto
Kurt Burian
By: McLaughlin + Wallenstein Attys.

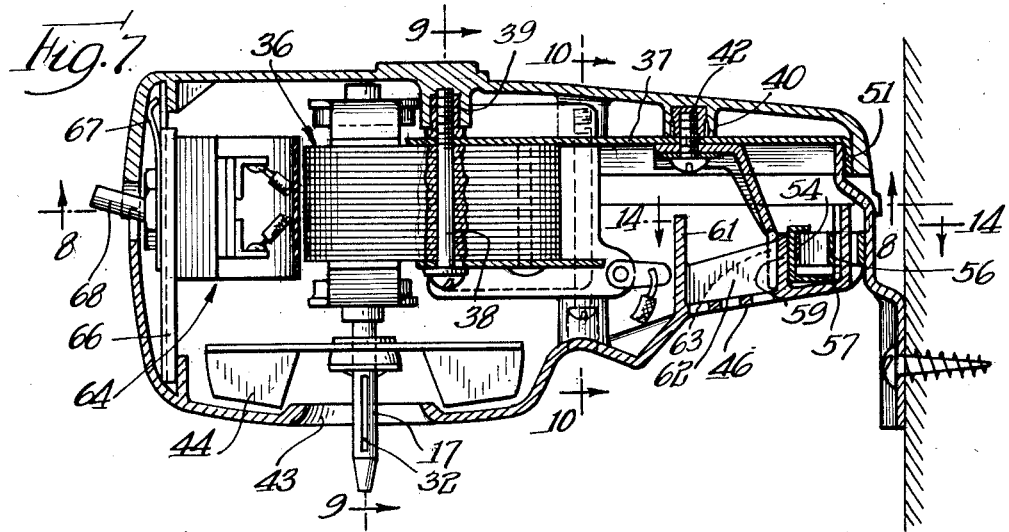
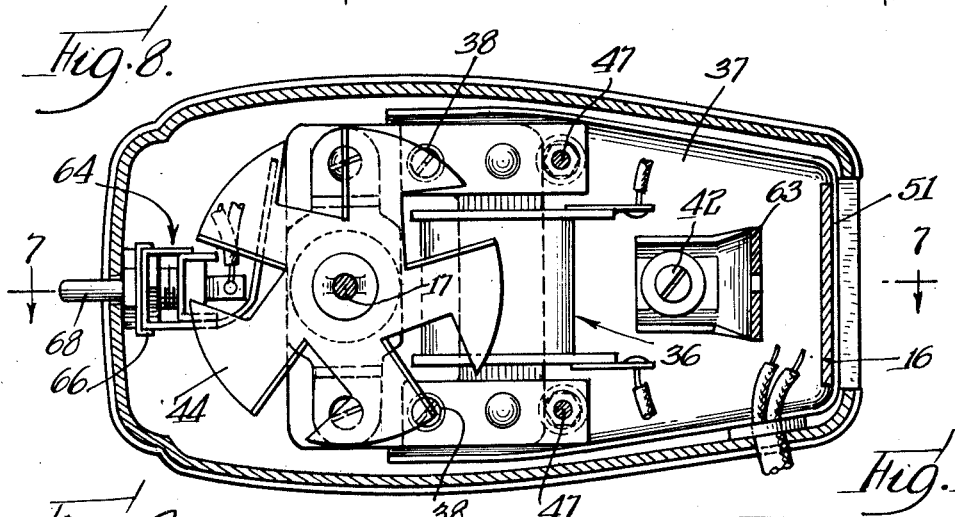
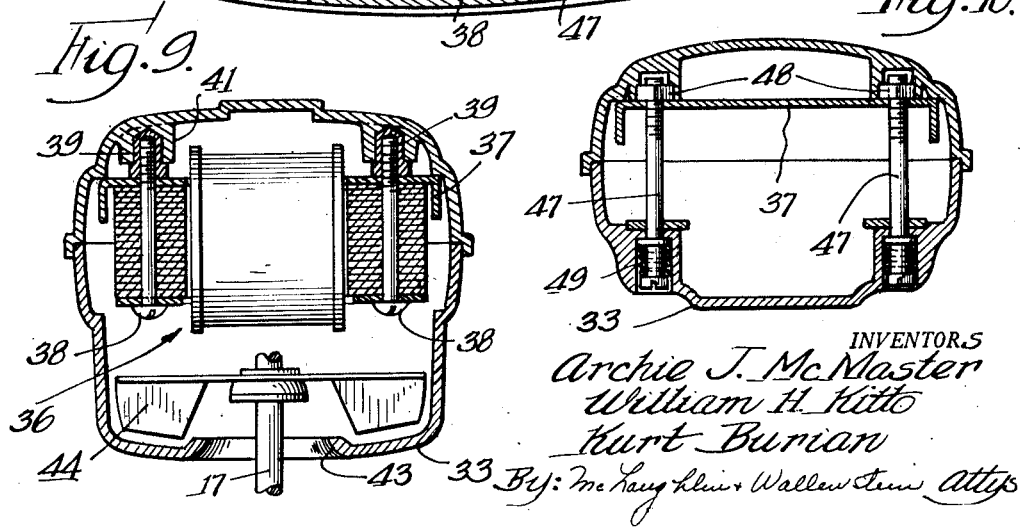

May 26, 1953 — A. J. McMASTER ET AL — 2,639,904
MIXER
Filed Dec. 13, 1949 — 3 Sheets-Sheet 3
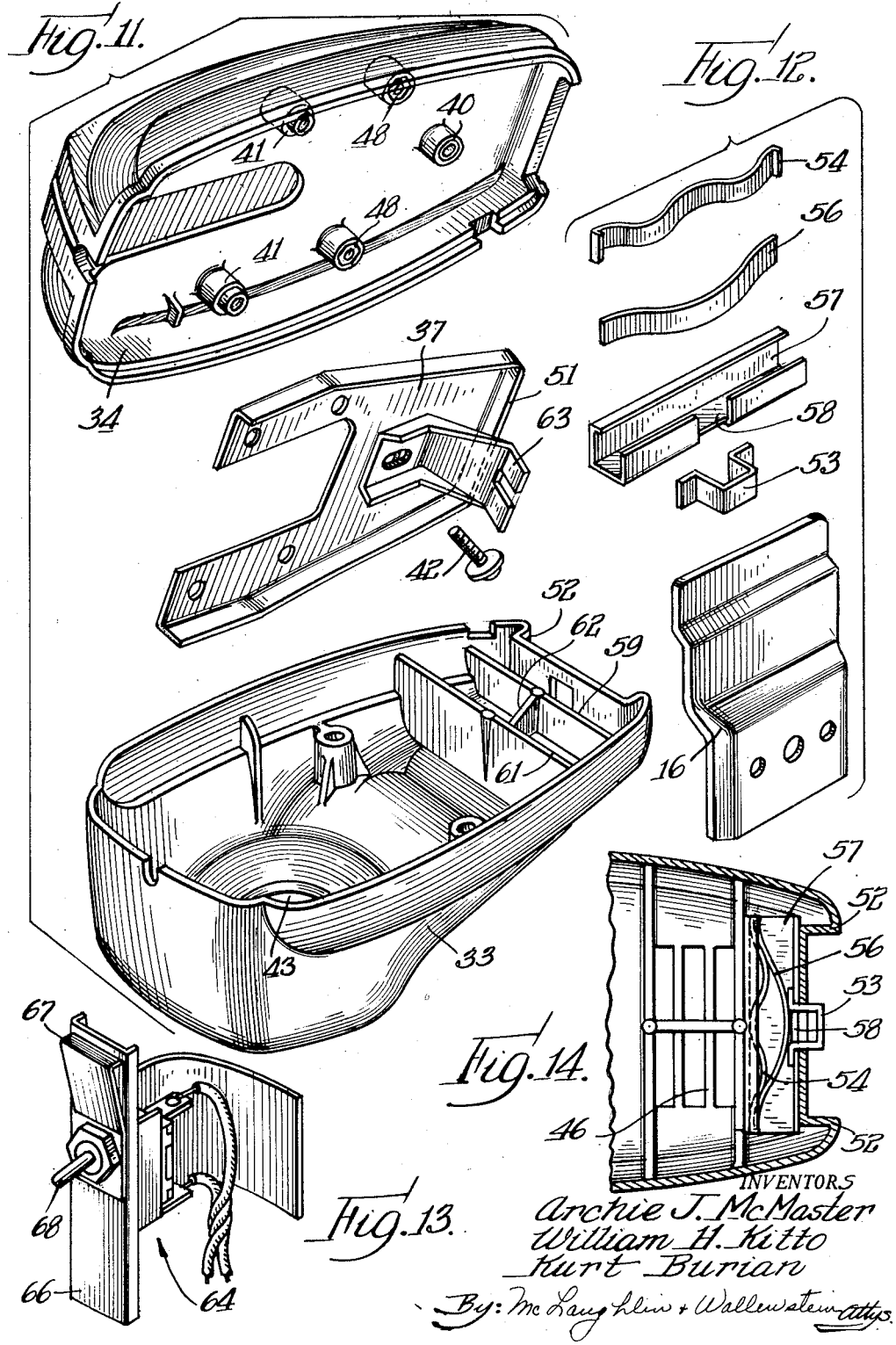
INVENTORS
Archie J. McMaster
William H. Kitto
Kurt Burian
By: McLaughlin & Wallenstein Attys.

Patented May 26, 1953

2,639,904

UNITED STATES PATENT OFFICE 2,639,904

MIXER

Archie J. McMaster, Deerfield, William H. Kitto, Evanston, and Kurt Burian, Chicago, Ill., assignors to G-M Laboratories, Inc., Chicago, Ill., a corporation of Illinois Application December 13, 1949, Serial No. 132,752

30 Claims. (Cl. 259—135)

Our invention relates to electric mixers, and particularly to a mixer which may be held in the hand, or mounted on a support such as a wall bracket.

The principal object of the present invention is the provision of an improved mixer particularly adapted for use in the home.

Another object is the provision of a mixer which is extremely effective for the intended purpose, and at the same time so safe that it may be used by small children.

Other specific objects and features of the invention will be brought out in connection with the following detailed description, taken with the accompanying drawings, wherein Fig. 1 is a side elevational view of a preferred embodiment of our invention, the mixer being shown supported from a wall bracket;

Fig. 2 is an enlarged elevational view, looking from the left of Fig. 1, of the agitator and part of the mixer motor shaft, parts being broken away to insure space, and a part of the agitator shaft and motor shaft being shown in section to illustrate structural features;

Fig. 3 is an enlarged transverse sectional view taken on the line 3—3 of Fig. 2;

Fig. 4 is an enlarged perspective view of the top of the agitator shaft, a retainer spring being shown removed to illustrate its construction;

Fig. 5 is a transverse sectional view of the agitator taken immediately above an inverted conical portion thereof, the view being taken on the line 5—5 of Fig. 2, looking in the direction of the arrows;

Fig. 6 is a schematic view of the agitator, showing the manner in which it functions during a mixing operation;

Fig. 7 is a full size (enlarged as contrasted with Fig. 1) longitudinal vertical sectional view through the mixer (with the agitator removed), the section being taken along the line 7—7 of Fig. 8;

Fig. 8 is a transverse sectional view taken on the line 8—8 of Fig. 7, looking in the direction of the arrows;

Fig. 9 is an irregular transverse sectional view taken along the line 9—9 of Fig. 7, showing the manner in which the motor assembly is secured to the upper housing;

Fig. 10 is a transverse sectional view taken on the line 10—10 of Fig. 7, showing the manner in which the lower housing is secured to the upper housing;

Fig. 11 is an exploded perspective view, showing the upper and lower housing, and a load bearing plate, the function of which is primarily to carry weight of the mixer when it is supported on its mounting bracket;

Fig. 12 is an exploded perspective view of the mounting bracket and energy absorption mechanism associated therewith;

Fig. 13 is a perspective view of a switch unit removed from the housing; and

Fig. 14 is a sectional view taken on the line 14—14 of Fig. 7, showing the energy absorbing mechanism in assembled relation.

Referring now to the drawings, the mixer there shown, comprises a mixer body 15 (Fig. 1) adapted to be supported on a wall bracket 16, but also adapted to be held in the hand, as will be explained hereinbelow. A downwardly extending motor shaft 17 (Fig. 2) is adapted to support and drive an agitator, generally identified by the reference character 18. The agitator 18 is formed of a continuous length of spring wire and comprises a helical shaft portion 19, a lower inverted conical portion 21, and an attachment portion 22. The lower part of the attachment portion 22 is reduced in diameter, and the upper helices engage this reduced portion frictionally to secure the spring portion of the agitator to the attachment portion 22. The uppermost convolutions 23 of the inverted conical portion 21 lie in a substantially flat plane perpendicular to the axis of rotation of the agitator. The helices of the inverted cone portion are of gradually decreasing pitch running from top to bottom, i. e., in the direction toward the apex of the cone. The lowermost convolution 24, however, has a reverse pitch, and lies in a plane inclined at an angle of about 30 degrees to the horizontal. This reverse pitch is afforded by bending the spring wire downwardly adjacent the lowermost convolution which also makes at least the lowermost convolution unsymmetical with respect to the axis of rotation, as illustrated in Fig. 2. The direction of rotation of the agitator is such that the lower end of the wire forming the agitator trails, and injury to person or clothing is prevented.

The attachment portion 22 is formed with a top socket 27, and at the socket is provided with a pair of axial slots 28, and near the top with an exterior annular groove 29 (Fig. 4). A retainer spring 31 has an annular portion lying in the groove 29 and pinching the upper slotted portion of the attachment member 22 together, and a lower detent portion extending into and at one point through one of the slots 28. The motor shaft 17 has an axial longitudinally extending kerf 32 into which the detent portion of the retainer spring 31 is adapted to extend. As particularly seen in Fig. 2, the lower chamfered end of the motor shaft 17 engages in a restricted diameter portion of the socket 27.

Referring now principally to Figs. 7 to 14, inclusive, the mixer has a bottom housing 33 and a top housing 34, in which the motor subassembly 36 is supported. A load bearing plate 37 is disposed between the motor assembly 36 and the top housing 34. The motor assembly is secured to the top housing by two screws 38 which extend through the lamination or stack portion of the motor and have their ends threaded into metal inserts 39 molded into bosses 41 forming a part of the housing. The plate 37 is clamped between the motor and bosses 41, and is also secured to the top housing by a screw 42 which also is threaded into an insert in a boss 40 forming a part of the housing.

The bottom housing 33 has a bottom aperture 43 through which the motor shaft 17 projects, and a chamber above and around the aperture 43 to house a cooling fan 44, which is driven by the motor shaft and draws air in through the aperture 43 and discharges the same through a grill 46. The bottom housing is secured to the top housing by a pair of long screws 47, the ends of which are threaded into hex nuts 48 imbedded in the top housing to prevent their turning but drawn against the top of the load bearing plate 37 as particularly shown in Fig. 10. Relatively small helically wound compression springs 49 lock the screws 47 against turning after they have been screwed into proper position.

When the mixer is mounted on the wall bracket 16, the support is such that very little load is placed on the housing—indeed, none on the bottom housing, and vibration damping and energy absorption means are provided for reasons which will be explained below. The means for accomplishing these functions are shown particularly in Figs. 7, 8, 11, 12 and 14. The load carrying plate 37 has a flange 51 so that when the upper part of the bracket 16 is extended above the shortened end 52 of the bottom housing, it engages in back of the flange 51 and in front of a load bearing plunger 53. The plunger is normally pressed outwardly (to the right in Fig. 7) by a pair of springs 54 and 56 retained within a channel member 57. One side of the channel member 57 is apertured at 58 to pass that portion of the plunger 53 which projects into engagement with the mounting bracket, so that the entire energy absorbing subassembly comprising the channel member, two springs and plunger is a unit which can be set into a recess formed between the end 52 of the bottom housing and a cross partition 59. A second cross partition 61 is also provided to prevent air being discharged directly to the grill 46, and a connecting fin 62 adds some rigidity to the partition 59. The major support for the channel member 59, however, is provided by the plate 37 through a bracket 63 fastened against the plate 37 by screw 42. It will be noted that the bracket 63 is bifurcated to accommodate the fin 62, and that it has an elongated opening to provide for adjustment toward or away from the partition 59 (note Fig. 7).

As shown, the mixer is provided with a switch unit 64 comprising a switch carrying member 66 and spring clip member 67 which frictionally engages in a pocket in the top housing as shown in Fig. 7 and retains the unit in position when the bottom housing is removed. A switch arm 68 projects through a slot in the housing for easy access.

The mixer of the present invention is intended primarily for mixing drinks and relatively light weight batter material, but its uses are not limited by the descriptive matter covering its preferred use. The helical spring agitator has definite features and advantages as will be explained, and its combination with remaining portions of the mixer permits its use as an instrument held in the hand, or as an instrument attachable to a support, as previously noted.

Among the features of the helically wound spring wire agitator are the provision of means to provide a standing wave, as shown schematically in Fig. 6. The agitation which takes place because of the angularity of the helices of the conical portion is thus further increased by the spring shaft performing in such manner as to produce a standing wave. This action takes place when the agitator is rotated at high speed, the unbalance of the agitator causing the flexible shaft portion to gyrate, thus producing an envelope of conical shape. Such gyration must be limited in degree to prevent such an unstable condition as to permit the angle of the conical envelope becoming larger and larger, and finally causing the agitator to be thrown entirely outside the axis of rotation due to increasing centrifugal force. Thus, a small amount of unbalance is usable, but too great an unbalance of the agitator is entirely unsatisfactory. The 30 degree angle referred to in the case of the lowermost convolution provides the desired unbalance considering the wire size, diameter and number of turns in the helical portion 19 of the agitator. In the particular embodiment described, very good results are obtained if the wire used is No. 15 gauge spring steel, with the individual helices having a diameter of $\frac{5}{8}$ inch, and with a total number of twenty-seven helices, twenty-two of them between the bottom of the attachment member 22 and the top of the inverted cone 21.

When an agitator is slightly unbalanced in the manner described, there is no question of its performing satisfactorily if held in the hand, because the hand provides a somewhat resilient support which absorbs the vibration caused by the unbalanced load. If a mixer having such an agitator be securely fastened to a support, however, the agitator may be unstable (i. e., the lower conical portion will move out of the axis of rotation) unless some dampening means are provided. The spring dampened plunger 53 vibrates in and out in response to vibrations within the mass of the mixer caused by the unbalanced actuator. The springs 54 and 56 are designed to absorb energy by the creation of heat where ends of the springs engage the channel member 57. Thus, the spring arrangement is the equivalent of a shock absorber, i. e., an inefficient spring which absorbs energy as it moves. This arrangement is very important in that it permits stable operation with an agitator having a degree of imbalance which would otherwise be unusable. If there were no energy absorption, the energy fed into the wall bracket would be returned to the vibrating system.

The use of the load bearing plate 37 in the manner described makes it possible to use injected molded plastic to form the housings, which may, therefore, have all of the advantages associated with injected molded devices, and still maintain the outer edges of the two portions to assure shape stability. The outer surfaces of the housing member may be substantially continuous except for the opening 43 and grill 46, and the bottom housing member is simply and easily removed to service or oil the motor.

The manner of attachment of the agitator to the motor shaft is simple and effective. The retainer spring 31 provides enough friction to retain the agitator, even though the spring is not engaged in the kerf 32, and when the rotatory load is sufficient to cause the agitator to slip, the retainer spring drops into the kerf 32 and acts as a key. The spring 31 also comprises the upper slotted portion of the attachment member 22 to cause it to engage the motor shaft, and the chamfered end of the motor shaft engages in the restricted portion of socket 27. Thus, the agitator and motor shaft are centered at two points. It will be noted also that the bottom of the kerf 32 curves outwardly from the axis of the motor shaft, and the retainer spring 31 engages the shoulder so formed to prevent the agitator from dropping off if other retaining means should be insufficient. It is obvious, therefore, that while the two point engagement between the motor shaft 17 and attachment member 22 primarily centers the agitator, and the spring 31 engaging in the kerf 32 keys the agitator against slipping rotationwise and holds the weight of the agitator, these several attachment features work together to secure a desired quick effective attachment between agitator and shaft which even a small child can operate without difficulty.

While the mixer of the present invention operates very effectively, it is extremely safe under all circumstances. The trailing end avoids the possibility of injury to clothing or parts of the body. The agitator may strike against or be bent against the side of a glass without injury to the agitator or the glass. The agitator may be taken in the hand and manipulated from side to side while it is running, and no damage of any kind will result. The horizontal top convolution 23 prevents small portions of liquid from being thrown out and over the top of a container.

We have described our invention in detail so that those skilled in the art may understand the same, but the scope of the invention is defined by the claims.

What we claim as new and desire to secure by Letters Patent of the United States is:

1. An electric mixer comprising a mixer body including a motor and motor shaft, an agitator having a resilient shaft attached to the said motor shaft, means on the agitator for unbalancing the same and thereby causing it to gyrate and form a standing wave, means for supporting said mixer, and means operatively associated with said supporting means for absorbing at least a part of the energy of vibration imparted to the mixer because of said unbalanced agitator.

2. An electric mixer comprising a mixer body including a motor and motor shaft, an agitator having a resilient shaft attached to the said motor shaft, means on the agitator for unbalancing the same and thereby causing it to gyrate and form a standing wave, means for supporting said mixer, and means operatively associated with said supporting means for absorbing at least a part of the energy of vibration imparted to the mixer because of said unbalanced agitator, said last mentioned means comprising a plunger supporting the weight of the mixer, and an inefficient spring flexed by vibrations imparted to the plunger.

3. An electric mixer comprising a mixer body including a motor and motor shaft, an agitator having a shaft in the form of a helically wound spring attached to the said motor shaft, means on the agitator for unbalancing the same and thereby causing the said helical spring to gyrate and form a standing wave, means for supporting said mixer, and means operatively associated with said supporting means for absorbing at least a part of the energy of vibration imparted to the mixer because of said unbalanced agitator.

4. An electric mixer comprising a mixer body including a motor and motor shaft, an agitator having a shaft in the form of a helically wound spring attached to the said motor shaft, means on the agitator for unbalancing the same and thereby causing the said helical spring to form a standing wave, means for attaching said mixer to a wall bracket, and resilient means on the mixer adapted, on engaging said bracket, to absorb at least a part of the energy of vibration imparted to the mixer because of said unbalanced agitator.

5. An electric mixer comprising a mixer body including a motor and motor shaft, an agitator shaft having a resilient shaft attached to the said motor shaft, means on the agitator for unbalancing the same and thereby causing it to gyrate and form a standing wave, and means for resiliently supporting said mixer, said supporting means absorbing at least a part of the energy of vibration imparted to the mixer because of said unbalanced agitator.

6. An electric mixer comprising a mixer body including a motor and motor shaft, an agitator shaft having a resilient shaft attached to the said motor shaft, means on the agitator for unbalancing the same and thereby causing it to vibrate and form a standing wave, means for supporting said mixer on a fixed upright bracket so that the said mixer projects horizontally from the bracket, said last mentioned means comprising a flange engaging over a top edge of the bracket, and a spring pressed plunger engaging the face of the bracket below the said top edge, so that susbtantially the entire weight of the mixer is applied against the said plunger, the said spring pressing the plunger being inefficient so that energy is absorbed as it is moved, and vibrations imparted to the mixer through the agitator are damped.

7. An electric mixer comprising a housing, a motor in the housing, a motor shaft projecting downwardly, an agitator supported and driven by the motor shaft and comprising a shaft formed of a plurality of helices of spring wire and a mixing head in the form of an inverted cone comprising helices of said same spring wire, the lowermost of said cone helices being irregular whereby to produce an unbalanced condition during rotation at high speed causing the helical shaft to gyrate and form a standing wave, a plunger carried by the housing, spring means urging said plunger in one direction, and supporting means for the mixer so constructed and arranged that the weight of the mixer forces the plunger toward said spring means, the said spring means being inefficient whereby it will absorb energy of vibration caused by the unbalanced agitator.

8. An electric mixer comprising a housing, a motor in the housing, a motor shaft projecting downwardly, an agitator supported and driven by the motor shaft and comprising a shaft formed of a plurality of helices of spring wire and a mixing head in the form of an inverted cone comprising helices of said same spring wire, the lowermost of said cone helices being irregular whereby to produce an unbalanced condition during rotation at high speed causing the helical shaft to gyrate and form a standing wave, a plunger carried by the housing, spring means urging said plunger in one direction, and supporting means for the mixer so constructed and arranged that the weight of the mixer forces the plunger toward said spring means, the said spring means comprising a closure holding a pair of leaf springs under compression so that their ends rub against the closure during movement of the plunger, and absorb energy of vibration.

9. An electric mixer comprising a housing, a motor in the housing, a motor shaft projecting downwardly, an agitator supported and driven by the motor shaft and comprising a shaft formed of a plurality of helices of spring wire and a mixing head in the form of an inverted cone comprising helices of said same spring wire, the lowermost of said cone helices being irregular whereby to produce an unbalanced condition during rotation at high speed causing the helical shaft to gyrate and form a standing wave, a plunger carried by the housing, spring means urging said plunger in one direction, and supporting means for the mixer so constructed and arranged that the weight of the mixer forces the plunger toward said spring means, the said spring means being inefficient whereby it will absorb energy of vibration caused by the unbalanced agitator, a load bearing plate clamped between the motor and housing, and a bracket carried by the plate to support said spring means.

10. An electric mixer comprising a housing, a motor in the housing, a motor shaft projecting downwardly and adapted to support an agitator in drive relation, an agitator in drive relation, an agitator supported and driven by the motor shaft and comprising a shaft formed of a plurality of helices of spring wire and a mixing head in the form of an inverted cone comprising helices of said same spring wire, the lowermost of said cone helices being irregular whereby to produce an unbalanced condition during rotation at high speed causing the helical shaft to gyrate and form a standing wave, a plunger carried by the housing, spring means urging said plunger in one direction, a load bearing plate clamped between the motor and housing with a flange at one end thereof, the flange and plunger being so related that said flange may be engaged by one end of a wall bracket and said plunger rests against a face of the bracket to support the mixer in horizontal position with the weight on said plunger and compressing said spring means, said spring means being constructed to absorb energy of vibration of the mixer.

11. An electric mixer comprising a housing, a motor in the housing, a motor shaft projecting downwardly, an agitator supported and driven by the motor shaft and comprising a shaft formed of a plurality of helices of spring wire and a mixing head in the form of an inverted cone comprising helices of said same spring wire, the lowermost of said cone helices being irregular whereby to produce an unbalanced condition during rotation at high speed causing the helical shaft to gyrate and form a standing wave, a load bearing plate clamped between the motor and housing, a flange on the plate engageable over a top edge of an upright bracket, a channel member carried by the housing below said load bearing plate, a leaf spring under compression in the channel, a plunger engageable against a front face of said bracket and positioned to force said spring in a direction to compress it further and a bracket carried by the load bearing plate and bearing against said channel to take the load off the housing, said spring having the capacity to absorb energy.

12. A mixer comprising a top housing, a motor secured in the top housing, a load bearing plate clamped between the motor and top housing, a bottom housing secured to the top housing with a bottom opening passing a downwardly projecting motor shaft, a flange on the load bearing plate engageable over a top edge of an upright bracket, a load member on the bottom housing engaging a front face of the bracket to support the mixer, and a bracket extending downwardly from the load bearing plate and engaging said load member to take strain of support from the bottom housing.

13. The combination defined in claim 12, including an agitator functioning to form a standing wave during rapid rotation, and energy absorption means associated with said load member.

14. A mixer comprising a downwardly directed rotatable motor shaft having a longitudinally extending axial kerf, an agitator detachably secured to the motor shaft and comprising an axially split socket with a top annular groove, and an attaching spring having a portion lying in said groove and a portion extending into one such slot to engage as a key in said kerf.

15. In a mixer, a rotatable single piece wire agitator comprising a helically wound spring shaft merging with the large end of a bottom inverted cone formed of helices of spring wire, said inverted conical portion having a nonsymmetrical helix to cause the same to gyrate and form a standing wave.

16. In a mixer, a rotatable single piece wire agitator comprising a helically wound spring shaft merging with the large end of a bottom inverted cone formed of helices of spring wire, and means to unbalance the agitator during rapid rotation sufficiently to cause the same to gyrate and form a standing wave.

17. In a mixer, a rotatable motor shaft, an agitator detachably secured to the motor shaft and comprising an attachment portion with a top socket for attachment to the motor shaft, a shaft portion formed of helically wound spring wire frictionally engaging said attachment member at its top, and terminating at its bottom in a bottom inverted cone formed by helices of graduated diameter, said socket having at least one axial slot and a top outer annular groove, and an attachment spring engaging in said groove with a portion extending through said slot for engagement in a kerf in the motor shaft.

18. In a mixer, a rotatable motor shaft, an agitator detachably secured to the motor shaft and comprising an attachment portion with a top socket for attachment to the motor shaft, a shaft portion formed of helically wound spring wire frictionally engaging said attachment member at its top, and terminating at its bottom in a bottom inverted cone formed by helices of graduated diameter, said socket having at least one axial slot and a top outer annular groove, and an attachment spring engaging in said groove with a portion extending through said slot for engagement in a kerf in the motor shaft, said attachment spring compressing said attachment member against the motor shaft, and the motor shaft having a chamfered portion engaging in a reduced diameter portion of the socket, so that the agitator is centered at two points on the motor shaft.

19. An electric mixer comprising a mixer body including a motor and motor shaft, an agitator having a resilient shaft attached to the said motor shaft to be rotated and gyrated about the axis of the motor shaft, means for supporting said mixer, and means operatively associated with said supporting means for absorbing energy and thereby controlling gyration of said agitator during its rotation, said last mentioned means comprising a closure holding a load carrying leaf spring and a leaf friction member compressed between said load carrying leaf spring and a wall of said closure.

20. An electric mixer comprising a mixer body including a motor and motor shaft, an agitator having a shaft in the form of a helically wound spring attached to the said motor shaft to be rotated and gyrated about the axis of the motor shaft, means for supporting said mixer, and means operatively associated with said supporting means for absorbing energy and thereby controlling gyration of said agitator during its rotation.

21. An electric mixer comprising a mixer body including a motor and motor shaft, an agitator member having a resilient shaft attached to the said motor shaft to be rotated and gyrated about the axis of the motor shaft, means for supporting said mixer on a fixed upright bracket so that the said mixer projects horizontally from the bracket, said last mentioned means comprising a flange engaging over a top edge of the bracket, and a spring pressed plunger engaging the face of the bracket below the said top edge, so that substantially the entire weight of the mixer is applied against the said plunger, and means for absorbing energy when said spring is pressed whereby vibrations imparted to the mixer through the gyrations of the agitator are damped.

22. An electric mixer comprising a housing, a motor in the housing, a motor shaft projecting downwardly, an agitator supported and driven by the motor shaft and comprising a shaft formed of a plurality of helices of spring wire and a mixing head in the form of an inverted cone comprising helices of said same spring wire, said agitator rotating and gyrating about the axis of the motor shaft, a plunger carried by the housing, spring means urging said plunger in one direction, and supporting means for the mixer so constructed and arranged that the weight of the mixer forces the plunger toward said spring means, the said spring means serving to absorb energy of vibration caused by the gyration of the agitator.

23. An electric mixer comprising a housing, a motor in the housing, a motor shaft projecting downwardly, an agitator supported and driven by the motor shaft and comprising a shaft formed of a plurality of helices of spring wire and a mixing head in the form of an inverted cone comprising helices of said same spring wire, the uppermost of said cone helices lying in a plane substantially perpendicular to the axis of rotation of said agitator, said agitator rotating and gyrating about the axis of the motor shaft, a plunger carried by the housing, spring means urging said plunger in one direction, and supporting means for the mixer so constructed and arranged that the weight of the mixer forces the plunger toward said spring means, the said spring means comprising a closure holding a pair of leaf springs under compression so that their ends rub against the closure during movement of the plunger and absorb energy of vibration caused by the gyration of the agitator.

24. An electric mixer comprising a housing, a motor in the housing, a motor shaft projecting downwardly, an agitator supported and driven by the motor shaft and comprising a shaft formed of a plurality of helices of spring wire and a mixing head in the form of an inverted cone comprising helices of said same spring wire, the uppermost of said cone helices lying in a plane substantially perpendicular to the axis of rotation of the agitator, said agitator rotating and gyrating about the axis of the motor shaft, a plunger carried by the housing, spring means urging said plunger in one direction, and supporting means for the mixer so constructed and arranged that the weight of the mixer forces the plunger toward said spring means, the said spring means serving to absorb energy and thereby control gyration of said agitator during its rotation, a load bearing plate clamped between the motor and housing, and a bracket carried by the plate to support said spring means.

25. An electric mixer comprising a housing, a motor in the housing, a motor shaft projecting downwardly, an agitator supported and driven by the motor shaft, a plunger carried by the housing, spring means urging said plunger in one direction, a load bearing plate clamped between the motor and housing with a flange at one end thereof, the flange and plunger being so related that said flange may be engaged by one end of a wall bracket and said plunger rests against a face of the bracket to support the mixer in horizontal position with the weight on said plunger and compressing said spring means, said spring means being constructed to absorb energy of vibration of the mixer.

26. An electric mixer comprising a housing, a motor in the housing, a motor shaft projecting downwardly, an agitator supported and driven by the motor shaft, a load bearing plate clamped between the motor and housing, a flange on the plate engageable over a top edge of an upright bracket, a channel member carried by the housing below said load bearing plate, a leaf spring member having a plurality of curved sections and disposed within said channel and against a rear wall thereof, a second leaf spring under compression in the channel, the second leaf spring being bowed at its intermediate portion and the ends normally resting against the ends of said first-mentioned leaf spring, a plunger engageable against a front face of said bracket and positioned to force said second leaf spring in a direction to compress it further, and a bracket carried by the load bearing plate and bearing against the rear of said channel to take the load off the housing, said leaf spring construction serving to absorb energy due to the rotation of said agitator.

27. A mixer comprising a downwardly directed rotatable motor shaft having a longitudinally extending concavely shaped axial kerf, an agitator detachably secured to the motor shaft and including a socket having a top annular groove, the wall of said socket having at least one axially extending slot therein, and an attaching spring having a portion lying in said groove and a portion extending into one such slot to engage as a key in said kerf.

28. A motor driven mixer agitator rotatable in one direction about a substantially vertical axis, formed from a single piece of spring wire and comprising an upper helically and closely wound spring shaft portion and an adjoining lower helically and loosely wound inverted conical portion, the uppermost convolutions of the inverted conical portion lying in a substantially flat plane, perpendicular to the axis of rotation of the agitator, the lower end of the wire at the apical end of the inverted conical portion trailing during rotation of the agitator, said agitator being capable of engagement by the hands during rotation without injury.

29. A motor driven mixer agitator rotatable in one direction about a substantially vertical axis, formed from a single piece of spring wire and comprising an upper helically and closely wound spring shaft portion and an adjoining lower helically and loosely wound inverted conical portion, the uppermost convolutions of the inverted conical portion lying in a substantially flat plane, perpendicular to the axis of rotation of the agitator, the lower end of the wire at the apical end of the inverted conical portion trailing during rotation of the agitator, the lowermost convolution of the conical portion having a reverse pitch, said agitator being capable of engagement by the hands during rotation without injury.

30. A motor driven mixer agitator rotatable in one direction about a substantially vertical axis, formed from a single piece of spring wire and comprising an upper helically and closely wound spring shaft portion and an adjoining lower helically and loosely wound inverted conical portion, the uppermost convolutions of the inverted conical portion lying in a substantially flat plane, perpendicular to the axis of rotation of the agitator, the lower end of the wire at the apical end of the inverted conical portion trailing during rotation of the agitator, the conical portion of the agitator having at least one non-symmetrical helix to cause the same to gyrate about the axis of rotation of the agitator and form a standing wave.

ARCHIE J. McMASTER.
WILLIAM H. KITTO.
KURT BURIAN.

References Cited in the file of this patent

UNITED STATES PATENTS

| Number | Name | Date |
|---|---|---|
| 99,883 | Haines | Feb. 15, 1870 |
| 375,274 | Dodson | Dec. 20, 1887 |
| 901,808 | Hamilton | Oct. 20, 1908 |
| 930,406 | McDonald | Aug. 10, 1909 |
| 1,011,883 | Carwright | Dec. 12, 1911 |
| 1,382,683 | Shelton | June 28, 1921 |
| 1,803,446 | Warrick | May 5, 1931 |
| 1,807,916 | Jones | June 2, 1931 |
| 2,406,389 | Lee | Aug. 27, 1946 |
| 2,483,727 | Frisbie | Oct. 4, 1949 |

FOREIGN PATENTS

| Number | Country | Date |
|---|---|---|
| 10,287 | Great Britain | May 28, 1894 |
| 579,609 | Great Britain | Aug. 9, 1946 |